UNITED STATES PATENT OFFICE.

FRANK K. CAMERON AND JOHN A. CULLEN, OF SALT LAKE CITY, UTAH, AND REED W. HYDE, OF NEW YORK, N. Y., ASSIGNORS TO AMERICAN SMELTING & REFINING COMPANY, OF SALT LAKE CITY, UTAH, A CORPORATION OF NEW JERSEY.

PRODUCTION OF ZINC CHLORID.

1,261,695.  Specification of Letters Patent.  Patented Apr. 2, 1918.

No Drawing.  Application filed June 18, 1917.  Serial No. 175,530.

*To all whom it may concern:*

Be it known that we, (1,) FRANK K. CAMERON, (2,) JOHN A. CULLEN, and (3,) REED W. HYDE, citizens of the United States, residing at (1,) Salt Lake City, (2,) Salt Lake City, (3,) New York city, in the counties of (1,) Salt Lake, (2,) Salt Lake, (3,) New York, and States of (1,) Utah, (2,) Utah, (3,) New York, have invented certain new and useful Improvements in the Production of Zinc Chlorid, of which the following is a specification.

This invention relates to the production of zinc chlorid from oxid ores of zinc, which term is here used to include sulfid ores or concentrates which have been subjected to a dead roast.

According to our invention the oxid ore of zinc is stirred with a strong solution of hydrochloric acid, a solution containing at least thirty per cent. of HCl being preferred. The amount of acid used is slightly in excess of the proportion required to satisfy all bases, as determined by analysis of the ore. The mixture is heated, at first slowly to permit the gradual escape of carbon dioxid and other gases, and then quickly to complete desiccation. The temperature is then raised to about 300° C., and so maintained until evolution of hydrochloric acid has substantially ceased. By this treatment iron, manganese, aluminum, silicon and magnesium are converted more or less completely into their insoluble oxids. The mass is then lixiviated with water and the solution filtered.

This solution contains practically all of the zinc in the form of chlorid, but may contain also calcium chlorid and some lead chlorid. These may be removed by adding the equivalent amount of sulfuric acid, or preferably of zinc sulfate, whereby calcium and lead are precipitated as sulfates which are only very slightly soluble in zinc chlorid solutions.

If appreciable amounts of iron or aluminum remain in solution they may be removed by known methods; or the solution may be further purified by crystallizing out the zinc in the form of a double halide salt with sodium chlorid, which salt is purified if desired by recrystallization and then decomposed by hydrochloric acid in strong solution, in the manner described in our copending application Serial No. 181,169, filed July 17, 1917. Sodium chlorid separates in solid phase, and the zinc chlorid may be recovered by simple evaporation, either as the anhydrous salt or as the crystalline hydrate. Zinc chlorid thus prepared is sufficiently pure for most purposes without having recourse to the usual and undesirable process of distillation.

We claim:—

Method of preparing zinc chlorid from oxid ores of zinc, which consists in reacting thereon with a strong solution of hydrochloric acid in proportions sufficient to combine with the bases present, desiccating the mass by heat and maintaining the same at about 300° C. until substantial evolution of hydrochloric acid ceases, and then dissolving the zinc chlorid from the mass.

In testimony whereof, we affix our signatures.

FRANK K. CAMERON,
JOHN A. CULLEN,
REED W. HYDE.